United States Patent

Mueller et al.

Patent Number: 5,377,049
Date of Patent: Dec. 27, 1994

[54] METHOD OF MAKING A SEGMENTED FOCUSING MIRROR

[75] Inventors: Dennis Mueller, Granite Bay; Donald Sandell, San Jose, both of Calif.

[73] Assignee: C & K Systems, Inc., Folsom, Colo.

[21] Appl. No.: 69,596

[22] Filed: Jun. 1, 1993

[51] Int. Cl.$^5$ .................................................. G01J 1/00
[52] U.S. Cl. ..................................... 359/853; 359/869
[58] Field of Search ............... 359/853, 851, 850, 866, 359/742, 741, 852, 864, 868, 869

[56] References Cited

U.S. PATENT DOCUMENTS

| | | | |
|---|---|---|---|
| 2,698,561 | 1/1955 | Crowell | 359/851 |
| 3,703,718 | 11/1972 | Berman | 359/853 |
| 4,050,444 | 9/1977 | Dolamore | 359/853 |
| 4,087,682 | 5/1978 | Kolodziej | 359/851 |
| 4,617,463 | 10/1986 | Muirhead | 359/853 |

FOREIGN PATENT DOCUMENTS 0219075 8/1985 Germany .................. 359/853

*Primary Examiner*—Eugene R. LaRoche
*Assistant Examiner*—A. Zarabian
*Attorney, Agent, or Firm*—Limbach & Limbach

[57] ABSTRACT

A segmented focusing mirror having a plurality of segments with each segment having a different focal length is made by constructing a plurality of mirrors with each mirror having a different focal length. The plurality of mirrors are sliced or are cut up into a plurality of segments. One or more segments of one mirror are combined with one or more segments of another mirror to form a master mirror. The master mirror has a common focal point with the segments having different focal lengths. A segmented focusing mirror is replicated from this master mirror by forming a mold of this master mirror and replicating therefrom.

6 Claims, 1 Drawing Sheet

METHOD OF MAKING A SEGMENTED FOCUSING MIRROR

TECHNICAL FIELD

The present invention relates to a method of making a focusing mirror having a plurality of segments with each segment having a different focal length and with all of the segments focusing radiation onto a single common focal point.

BACKGROUND OF THE INVENTION

A segmented focusing mirror for use in a passive infrared intrusion detection device is well known in the art. See, for example, U.S. Pat. No. 3,703,718. In a segmented focusing mirror, a mirror has a plurality of segments. Each of the segments receives infrared radiation from a projected finger like region, spaced apart from one another. Each of the segments has a focal length, which is different from others. The plurality of segments all focus the infrared radiation received onto a common focal point where a detector is located.

The degree of spread or divergence of each of the finger like regions is controlled by the focal length of its associated segment. To receive a wide projection from a finger like region, a shorter focal length for a segment is required. Shorter focal length is usually used with segments that are directed to detect intrusion near the detector. In contrast, a finger like region having a narrow width projection, for receiving infrared radiation from far distance, a longer focal length mirror segment is required.

In the prior art, a segmented focusing mirror having a plurality of different focal lengths of the type disclosed in U.S. Pat. No. 3,703,718 has been made by simply constructing a master mirror having the complex requirement of different segments having different focal lengths and yet with all the radiation from each of the segments focused onto a single focal point. A mold is made from this master mirror from which other mirrors are replicated. If errors are made in the master mirror in which either the radiation from the different segments are not focused at the same common focal point and/or the focal lengths selected for one or more of the segments is incorrect in that the finger like regions is projected either too wide or too narrow, then a new master mirror must be re-tooled. This has been expensive.

Fresnel lens has been used also for many years. The drawback of using a fresnel lens to focus radiation is that not all the segments are at the same distance from the detector.

SUMMARY OF THE INVENTION

In the present invention a method of making a segmented focusing mirror having a plurality of segments each with different focal length is described. The method comprises the steps of constructing a plurality of mirrors with each mirror having a different focal length. Each mirror is sliced into a plurality of segments. A master mirror is made by combining one or more segments of one mirror with one or more segments of another mirror. The segments are arranged to form the master mirror having a common focal point. Segmented focusing mirrors are replicated from this master mirror.

DETAILED DESCRIPTION OF THE DRAWINGS

Figure 1:
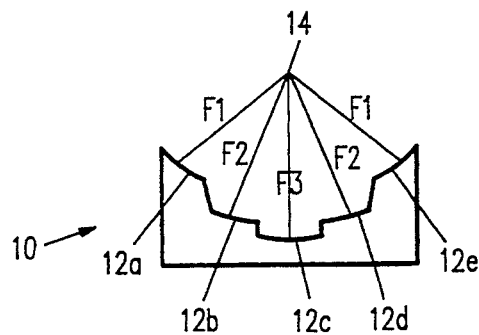
FIG. 1 is a side view of a segmented focusing mirror of the prior art.

Referring to FIG. 1, there is shown a side view of a segmented focusing mirror 10 of the prior art. In the prior art, a segmented focusing mirror 10 has a plurality of segments, shown in FIG. 1 as segments 12(a-e). Although the mirror 10 is a segmented mirror, it is of unitary construction. Each of the segments 12(a-e) can receive infrared radiation or any other type of electromagnetic radiation and focus them onto a common focal point 14. Segments 12a and 12e have the same focal length designated as F1. Segments 12b and 12d have the same focal length designated as F2. Segment 12c has a focal length F3. The focal lengths F1, F2, and F3 are all different. As previously stated, the difference in the focal length F1, F2 and F3 causes the segments to which it is associated to have a region or finger like projection whose width of projection depends upon the focal length. If the focal length of a segment is short compared to the focal lengths of other segments, then the region to which the segment receives radiation would be wider and the segment is more suited to receive radiation from closer distance to the focusing mirror 10. Conversely, if a segment has a focal length longer than the focal length of other segments, the segment is adapted to receive radiation which is more distant from the mirror 10. At the common focal point 14, a detector (not shown) would be placed to detect the infrared radiation received from all the different regions as focused by the different segments 12(a-e).

Figure 2A:
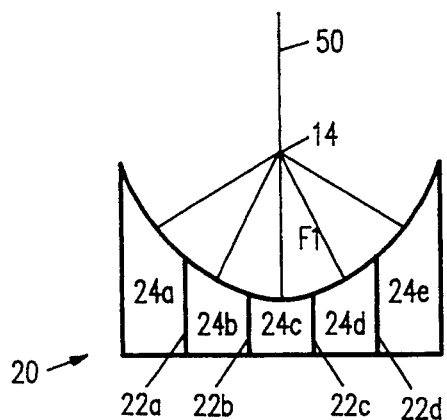
FIGS. 2(a-c) are side views of a plurality of mirrors, with each having a different focal length, showing the slicing thereof to form a plurality of segments, with the segments used to form a master mirror.
Figure 2B:
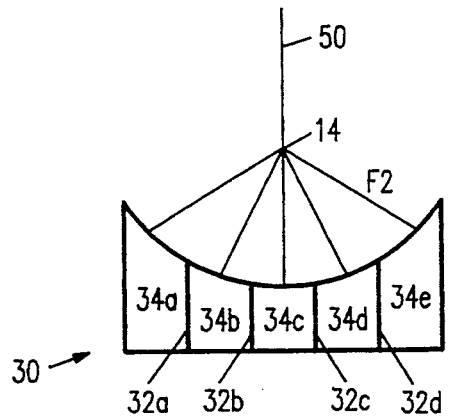
Figure 2C:
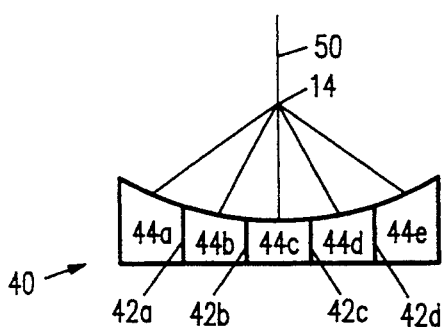

In the method of the present invention, a plurality of focusing mirrors 20, 30 and 40 are first formed. Referring to FIGS. 2(a-c) there is shown a side view of three focusing mirrors 20, 30 and 40 respectively. Each of the focusing mirrors 20, 30 and 40 is suited to receive radiation, such as infrared radiation, and focuses them onto a focal point 14. Furthermore, each of the mirrors 20, 30 and 40 has a focal length different from one another. Thus, focusing mirror 20 has a focal length of F1. Focusing mirror 30 is constructed having a focal length of F2. Focusing mirror 40 has a focal length of F3. The focal lengths F2, F2 and F3 are different.

The focal point 14 for each of the focusing mirrors 20, 30 and 40 lies along a focus axis 50. In the method of the present invention, each of the focusing mirrors 20, 30 and 40 is sliced or is cut up in planes that are parallel to one another and are parallel to the focus axis 50. Thus, as shown in FIG. 2a, the focusing mirror 20 is sliced or is cut up along the planes 22(a-d) each of which is parallel to one another and is paralleled to the focus axis 50. Cutting the focusing mirror 20 results in a plurality of segments 24(a-e), each of which has a focal length F1. Similarly, the focusing mirror 30 shown in FIG. 2b is sliced or is cut up along the planes 32(a-d) each of which is parallel to one another and is parallel to the focusing axis 50. This results in a plurality of segments 34(*a–e*) each of which has a focal length F2.

Finally, in similar manner, the focusing mirror 40 is sliced or cut up along planes 42(*a–d*) each of which is parallel to one another and is parallel to the focusing axis 50. This results in a plurality segments 44(*a–e*) each of each has a focal length F3.

Figure 3:
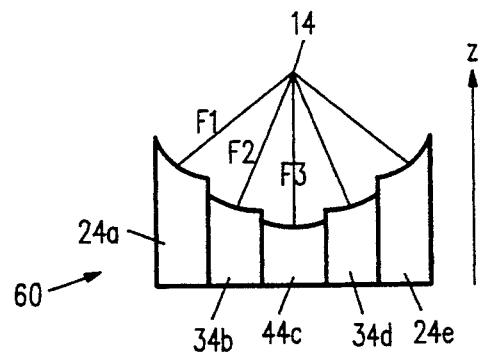
FIG. 3 is a side view of a master mirror formed by the segments from each of the plurality mirror shown in FIGS. 2(a-c).

Thereafter, one or more segments of each of the mirrors 20, 30 and 40, which have been segmented, are combined to form a master mirror 60. Referring to FIG. 3 there is shown the master mirror 60 formed by combining certain segments of the focusing mirrors 20, 30 and 40. In particular, the master mirror 60 is formed by using segments 24*a*, 34*b*, 44*c*, 34*d*, and 24*e*. Since all of the segments 24*a*, 34*b*, 44*c*, 34*d* and 24*e* were cut up along planes parallel to the focusing axis 50, by adjusting or moving these segments 24*a*, 34*b*, 44*c*, 34*d* and 24*e* along the Z axis or the focusing axis 50, the segments can be made to focus the radiation onto a common focal point 14 which also lies on the focusing axis 50. This results in the master mirror 60 having a common focal point 14, and a plurality of segments each of which has a focal length different from the other.

From this master mirror 60, a mold is made. Thereafter, segmented focusing mirrors can be replicated from the mold of the master mirror 60.

There are many advantages of the method of the present invention. First, a plurality of the focusing mirrors, each having a different focal lengths can be pre-made and pre-segmented. Thereafter, as a requirement for a new segmented focusing mirror with a plurality of segments with each segment having a different focal length is required, various segments from the ready made focusing mirrors can be used to be combined to form a master mirror. This eliminates the requirement of tooling a different master mirror each time segments of different focal lengths is required thereby saving costs as well as time in the tooling process. Furthermore, if a mistake is made in one of the segments, all that is required is to re-tool that particular segment and replace that particular segment. The entire master mirror does not have to be re-tooled. This also saves time and costs in the development of the master mirror.

What is claimed is:

1. A method of making a segmented focusing mirror comprising the steps of:

constructing a plurality of mirrors, each having a different focal length;

slicing each mirror into a plurality of segments;

combining one or more segments of one mirror with one or more segments of another mirror to form a master mirror having a common focal point; and replicating the segmented focusing mirror from said master mirror.

2. The method of claim 1 wherein each of said plurality of segments of each mirror, has a common focal point and a focal length.

3. The method of claim 2 wherein each of said plurality of mirrors has a focal point located along a focus axis.

4. The method of claim 3 wherein each segment of each mirror is sliced along a plane parallel to the focus axis.

5. A method of making a mirror having a plurality of different focal lengths, comprising the steps of:

constructing a plurality of mirrors, each having a focal point along a focus axis, and a different focal length;

cutting each of said plurality of mirrors into a plurality of segments along planes parallel to one another and to the focus axis;

combining one or more segments of the plurality of mirrors having different focal lengths to form a master mirror having a common focal point, and a plurality of different focal lengths, and replicating mirrors from said master mirror.

6. The method of claim 5 wherein said combining step further comprising:

positioning one or more segments of the plurality of mirrors adjacent to one another with the planes along which each segment was cut parallel to one another and with the segments facing the same direction, to form a master mirror; and moving one or more segments relative to one another along a line parallel to the plane along which each segment was cut to form the common focal point.

* * * * *